(12) United States Patent  
Muttik et al.

(10) Patent No.: US 10,778,667 B2  
(45) Date of Patent: *Sep. 15, 2020

(54) METHODS AND APPARATUS TO ENHANCE SECURITY OF AUTHENTICATION

(71) Applicant: McAfee, LLC, Santa Clara, CA (US)

(72) Inventors: Igor Muttik, Aylesburym (GB); Adam Marek, Gdansk (PL); Alex Nayshtut, Gan Yavne (IL)

(73) Assignee: McAfee, LLC, Santa Clara, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/685,452

(22) Filed: Nov. 15, 2019

(65) Prior Publication Data

US 2020/0092274 A1 Mar. 19, 2020

Related U.S. Application Data

(63) Continuation of application No. 15/118,497, filed as application No. PCT/PL2014/050020 on Apr. 24, 2014, now Pat. No. 10,516,657.

(51) Int. Cl.
*H04L 9/00* (2006.01)
*H04L 29/06* (2006.01)
*G06F 21/32* (2013.01)
*H04L 9/32* (2006.01)

(52) U.S. Cl.
CPC ............. *H04L 63/08* (2013.01); *G06F 21/32* (2013.01); *H04L 9/3247* (2013.01); *H04L 63/083* (2013.01); *H04L 63/0861* (2013.01); *G06F 2221/2151* (2013.01)

(58) Field of Classification Search
CPC ....................................... H04L 63/08
USPC .......................................................... 713/176
See application file for complete search history.

(56) References Cited

U.S. PATENT DOCUMENTS

| 7,386,448 | B1 | 6/2008 | Poss et al. |
| 7,512,567 | B2 | 3/2009 | Bemmel et al. |
| 9,270,807 | B2 | 2/2016 | Shivappa et al. |
| 2004/0128500 | A1 | 7/2004 | Cihula et al. |
| 2007/0292034 | A1 | 12/2007 | Tabankin |

(Continued)

FOREIGN PATENT DOCUMENTS

| EP | 2560122 | 2/2013 |
| TW | 454419 | 9/2001 |
| WO | 2015163774 | 10/2015 |

OTHER PUBLICATIONS

International Searching Authority, "International Search Report and Written Opinion," issued in connection with International Application No. PCT/PL2014/050020, dated Jan. 23, 2015, 9 pages.

(Continued)

*Primary Examiner* — Christopher J Brown
(74) *Attorney, Agent, or Firm* — Hanley, Flight & Zimmerman, LLC

(57) ABSTRACT

A system is disclosed that includes a processor including watermark logic to output a first watermark to an output device that outputs a first watermark signal, based on the first watermark, to an acoustic transmission medium. The processor also includes recording logic to capture, at a first time period, an authentication submission comprising the first watermark signal convolved, via the acoustic transmission medium, with a first passphrase signal. The system also includes a dynamic random access memory (DRAM). Other embodiments are disclosed and claimed.

20 Claims, 7 Drawing Sheets

(56) References Cited

U.S. PATENT DOCUMENTS

| | | |
|---|---|---|
| 2008/0098222 A1 | 4/2008 | Zilberman |
| 2009/0288148 A1 | 11/2009 | Headley et al. |
| 2012/0311623 A1 | 12/2012 | Davis et al. |
| 2013/0132091 A1 | 5/2013 | Skerpac |
| 2013/0226586 A1 | 8/2013 | Jang et al. |
| 2014/0109211 A1 | 4/2014 | Suzuki et al. |
| 2014/0258110 A1 | 9/2014 | Davis et al. |

OTHER PUBLICATIONS

International Bureau, "International Preliminary Report on Patentability," issued in connection with International Application No. PCT/PL2014/050020, dated Oct. 25, 2016, 7 pages.

Taiwan Patent Office, "First Office Action," issued in connection with Taiwan Patent Application No. 104107778, dated Feb. 24, 2017, 3 pages.

Taiwan Patent Office, "Notice of Allowance," issued in connection with Taiwan Patent Application No. 104107778, dated Dec. 13, 2017, 3 pages.

Taiwan Patent Office, "Notice of Allowance," issued in connection with Taiwan Patent Application No. 106141915, dated Apr. 23, 2018, 3 pages.

United States Patent and Trademark Office, "Final Office Action," issued in connection with U.S. Appl. No. 15/118,497, dated Aug. 1, 2018, 12 pages.

United States Patent and Trademark Office, "Non-Final Office Action," issued in connection with U.S. Appl. No. 15/118,497, dated Jan. 12, 2018, 9 pages.

United States Patent and Trademark Office, "Non-Final Office Action," issued in connection with U.S. Appl. No. 15/118,497, dated Dec. 26, 2018, 10 pages.

United States Patent and Trademark Office, "Final Office Action," issued in connection with U.S. Appl. No. 15/118,497, dated Jul. 22, 2019, 8 pages.

United States Patent and Trademark Office, "Advisory Action," issued in connection with U.S. Appl. No. 15/118,497, dated Nov. 20, 2018, 5 pages.

United States Patent and Trademark Office, "Notice of Allowance and Fee(s) Due," issued in connection with U.S. Appl. No. 15/118,497, dated Sep. 27, 2019, 7 pages.

METHODS AND APPARATUS TO ENHANCE SECURITY OF AUTHENTICATION

RELATED APPLICATIONS

This application arises from a continuation of U.S. patent application Ser. No. 15/118,497, filed Aug. 12, 2016, entitled "Methods and Apparatus to Enhance Security of Authentication," which is a national stage entry application claiming priority to International Patent Application Serial No. PCT/PL2014/050020, filed Apr. 24, 2014, entitled "Methods and Apparatus to Enhance security of Authentication." The entireties of U.S. patent application Ser. No. 15/118,497 and International Patent Application Serial No. PCT/PL2014/050020 are hereby incorporated herein by reference.

TECHNICAL FIELD

The field is enhancement of security of authentication.

BACKGROUND

Authentication, e.g., via human voice, may be used to identify a user of a computing device, e.g., for security purposes. Additionally, audio input may be used to communicate commands, data, etc. Due to ease with which to surreptitiously record sounds, issues of recognition and replay attacks may arise when a voice password or a passphrase is reused.

One approach for authentication is to request that the user speak a unique passphrase, e.g., random words, during each identification/authentication session. The uniqueness of the phrase may dissuade attackers from reuse of the recording. However, it may be difficult for the user to pronounce the passphrase, and may be difficult for the computer to determine authenticity without a learning period.

DETAILED DESCRIPTION

Figure 1:
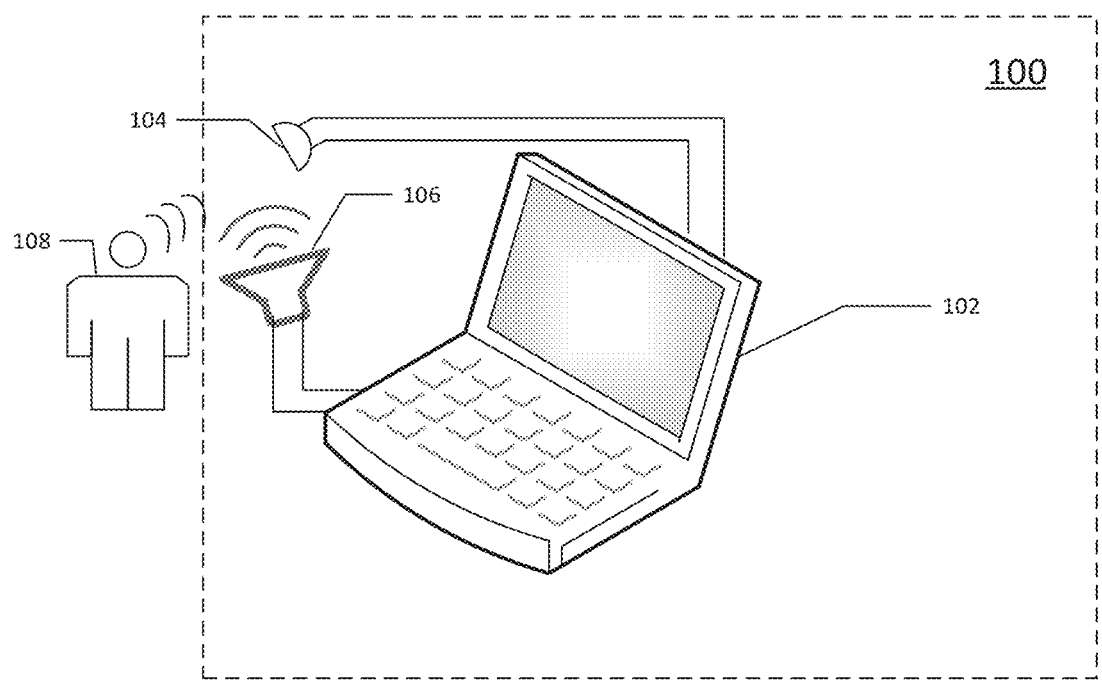
FIG. 1 is a block diagram of a system, according to an embodiment of the present invention.

Embodiments mix (e.g., convolve) human voice with computer-generated sound ("watermark") and analyze combined sounds received via a microphone (e.g., a computer microphone that is integral to a computational device) or other acoustic input transducer whose output (e.g., electrical signal) can be input to the computational device.

An authentication standard may be recorded. In some embodiments the authentication standard is an audio recording of a "pure" passphrase, e.g., without watermark, as spoken by a user. In other embodiments, the authentication standard is a watermarked version of the passphrase spoken by the user.

A malicious recording (e.g., surreptitious recording of the voice and watermark while the authentication standard is being recorded) may be intended for malicious authentication, e.g., at another time. During an authentication analysis of such a malicious recording, a recorded passphrase can be rejected based on detection and analysis of the accompanying watermark, and/or based on verification of the passphrase, biometric parameters associated with the originator (e.g., vocal characteristics), and/or comparison of other factors.

In an embodiment, the user, a computer, or the user and the computer jointly, may select a passphrase. For instance, the passphrase may be an expression that can be considered uncommon in everyday conversation. The passphrase may be selected by the user, e.g., via selection from a dropdown list that is accessible to the user through e.g., a monitor screen of the computer.

The user can pronounce the passphrase, which is recorded in order to create an authentication standard, e.g., a reference recording for use by the computer in future identification/authentication analysis. In some embodiments, the authentication standard (also "enrollment" herein) is a clean (e.g., non-watermarked) recording. In other embodiments, while the user-pronounced passphrase is being recorded, the computer (or another source) may emit an audio watermark (e.g., via an acoustical output transducer such as a speaker) that can mix with the passphrase as it is being pronounced to produce a watermarked passphrase, e.g., a convolution of the audio passphrase and the watermark. The watermark can be created while the passphrase is being pronounced. The watermark may include time dependent information such as a time stamp, location information, etc., and may also include sounds that mask or change a recording of the spoken passphrase, e.g., interference frequencies, additive frequencies, pulsed frequencies, ultra-low or ultra-high frequencies, variable frequency signals, etc.

In an embodiment, each time the passphrase is requested from the user for authentication (e.g., identification) purposes, an authentication submission is created in response. During recording of the authentication submission, the computer provides a distinct (e.g., time dependent) watermark to be acoustically convolved (e.g., convolution via concurrent transmission through a common acoustic medium such as air) with the passphrase as the passphrase is being recorded. If an attacker were to record the passphrase while in close proximity to the speaker that supplies the watermark and while the authentication submission is being created (e.g., the attacker creates an attacker recording), the attacker recording would contain the watermark emitted by the computer at the time of the authentication submission. If, at a later time, the attacker were to attempt use of the attacker recording as an authentication submission, the attacker recording would be differentiable from another authentication submission, e.g., the attacker recording includes password and previously recorded watermark, which is convolved with a current watermark when submitted as an authentication submission. Thus, the watermark can be used to identify of unsolicited attacks to a system.

The watermark may include component frequencies within a human audible range (e.g., approximately 20 Hz to approximately 20,000 Hz) that can be used to modify/manipulate the human voice as the passphrase is being recorded. In an embodiment, during creation of the authentication standard, while receiving the human voice, the computer can analyze the voice and can emit watermark frequencies close to expected voice patterns based on, e.g., known patterns of human voice syllables, diphthongs, etc. For example, the computer may output one or more frequencies, including minor variations of pitch that may be embedded within the watermarked passphrase.

The additional frequencies introduced into the recording of the authentication standard may help to ensure that an attacker recording will not be successful in authentication. The watermark may also embed data (e.g., timestamp, location, etc.) in component frequencies that are within or outside of the human audible range, for further verification of authentication.

A computer-generated watermark may also include one or more elements that may help to identify a time and/or place where a malicious recording has been made. Elements may include 1) timestamp, which may be cryptographically signed (e.g., trusted time); 2) global positioning (GPS) coordinates; 3) a photograph, e.g., from a webcam device; 4) a unique computer identification; 5) one or more random numbers that may make the watermark unpredictable; 6) a one-time programmable (OTP) sequence, which may make a watermark predictable only to recipients who share the OTP sequence. Other elements may also be included in the watermark.

FIG. 1 is a block diagram of a system 100, according to an embodiment of the present invention. The system 100 includes a computer 102 (e.g., a computational device, e.g., laptop, tablet, desktop, smart phone, etc.), a microphone (or other receiving acoustic transducer) 104, and a speaker (or other transmitting acoustic transducer) 106.

In operation, an authentication submission is to be created. A user 108 is provided (or selects) a passphrase, e.g. via a drop-down menu on a display screen of the computer 102. Commencement of a recording by the computer may be triggered, e.g., via keyboard input, mouse input, voice detection, etc. As the user 108 pronounces the passphrase, user utterances are input to the computer 102 via to the microphone 104 while watermark information output from the computer 102 through the speaker 106 is captured concurrently. The microphone 104 records the user utterances (or replay from an attacker) concurrently with the output of the speaker 106 as a (single) convolved input, e.g., acoustically convolved due to concurrent transmission via a common acoustic medium (e.g., air). Watermark information that is output through the speaker 106 may be dependent upon the utterances as they are being received, e.g., dependent on frequencies of the user utterances that may change during pronunciation of the passphrase. Upon completion of pronunciation of the passphrase by the user 108, the recording may be ended, e.g., via keyboard input, mouse input, automatic amplitude detection, etc.

An authentication standard may be stored in the computer 102. For example, in one embodiment the authentication standard is a recording of the (pure) passphrase spoken by the user 102. The computer 102 includes analysis logic (not shown) to analyze the authentication submission and to determine whether authentication is to be granted or denied, based on a comparison of the authentication submission to the stored authentication standard and to the current watermark used to form the authentication submission.

Figure 2:
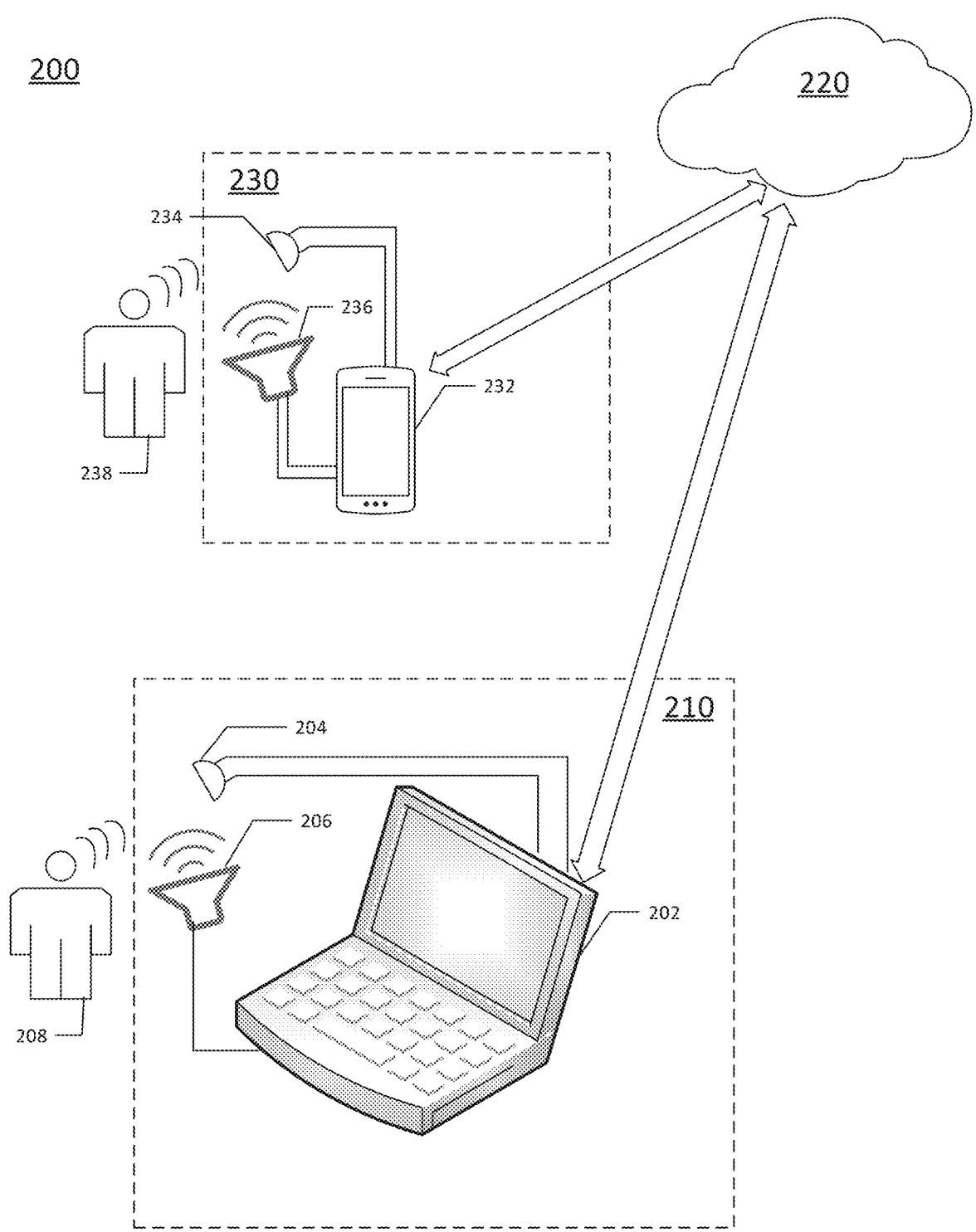
FIG. 2 is a block diagram of a system, according to another embodiment of the present invention.

FIG. 2 is a block diagram of a system 200, according to another embodiment of the present invention. The system 200 includes apparatus 210 to record an authentication standard, apparatus 230 to receive an authentication submission and to determine whether authentication is to be granted or refused, and a cloud computational server ("cloud" herein) 220 that may store the authentication standard and/or other parameters, e.g., biometric parameters of the user's voice, watermark parameters, etc.

In operation, the authentication standard may be created at a first time (e.g., a first time period) in the apparatus 210 by recording (e.g., captured via a microphone 204 and input into the computer 202) a passphrase uttered by a user 208 and (optionally) convolved with an audio watermark that is generated by the computer 202 and is output from a speaker 206. Convolution of the passphrase and the watermark occurs as a result of concurrent transmission over a common transmission medium (e.g., air) between the user 208, the microphone 204, and the speaker 206. (In other embodiments, the spoken passphrase may be input to the computer 202 via the microphone 204, to be mixed with the watermark audio signal within the computer 202, instead of transmitting the watermark audio signal via speaker 206). In another embodiment the watermark may not be included into the authentication standard; rather a "pure passphrase" (without watermark) may be captured and stored as the authentication standard.

The authentication standard determined at apparatus 210 can be uploaded to the cloud 220. Additionally, other parameters may be uploaded to the cloud 220 including biometric parameters associated with the voice of the user 208, parameters associated with the watermark, time-dependent parameters, and other parameters.

At a second time, e.g., during a second time period that occurs after the authentication standard is created and uploaded, a user 238 may request authentication from apparatus 230. Upon indication that a computing device 232 is ready to accept an authentication submission (e.g., record a passphrase that may be, e.g., user-selected), user 238 may utter the passphrase. In an example, the passphrase is identical to the paraphrase that was entered in the apparatus 210 for creation of the authentication standard. As the user 238 speaks the passphrase, a (current) watermark may be generated by the computing device 232 and output as a current watermark signal, e.g., an acoustic wave, via speaker 236 to be transmitted concurrently with transmission of the passphrase. The spoken passphrase and the current watermark may be recorded via microphone 234 and the spoken passphrase and current watermark may be convolved as a result of concurrent transmission over a common acoustic transmission medium. (In another embodiment (not shown), the spoken passphrase may be recorded via the microphone 236 and convolved with the current watermark within computing device 232, e.g. without transmission though the speaker 236.)

The computing device 232 may analyze the authentication submission including comparison with stored the authentication standard. Any deviation of the authentication submission from an expected signal (e.g., the pure passphrase convoluted with the current watermark) provides an indication of inauthenticity. Additional analysis may include comparisons of one or more biometric parameters based on vocal characteristics, other stored parameters that the computing device 232 may access from the cloud 220. The computing device 238 may grant or deny authentication to the user 238 based on the analysis.

In an embodiment, the computing device 232 uses a loudspeaker ("speaker") during identification/authentication to provide an audio version of the watermark that is to be combined (convolved) with the passphrase as the passphrase is being transmitted and recorded. If the computer were to detect that the speaker is disabled at any point, e.g. immediately before or during the passphrase evaluation, which may be detected, e.g., by a lack of feedback, the disconnection may indicate that attackers are attempting to obtain a clear-text passphrase, e.g., passphrase without watermark. If disablement of the speaker is detected, the session can be terminated and the passphrase can be discarded as potentially compromised.

In an embodiment, a special function may be invoked in the computer to allow speaker operation during voice authentication even if the speaker is disabled in software.

Figure 3:
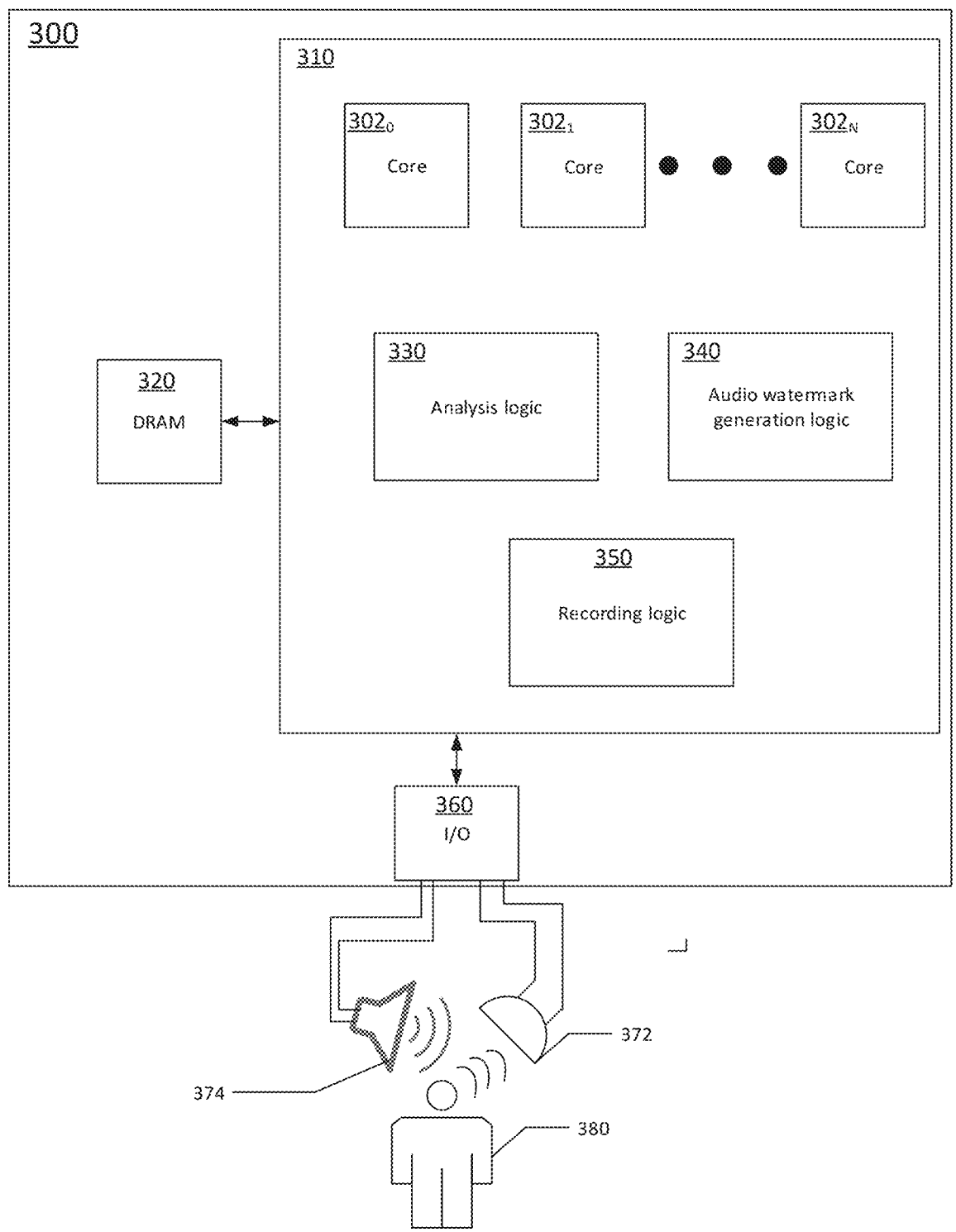
FIG. 3 is a block diagram of a system to authenticate a passphrase, according to an embodiment of the present invention.

FIG. 3 is a block diagram of a system 300 to authenticate a user, according to an embodiment of the present invention. The system 300 includes a multi-core processor 310 that includes cores $302_0$-$302_N$, dynamic random access memory (DRAM) 320, and input/output circuitry (I/O) 360.

In operation, at a first time (during a first time period) an authentication standard may be established by recording, via recording logic 350 of the processor 310, a passphrase uttered by a user 380 and input to an acoustic input transducer (e.g., microphone) 372. In some embodiments, the authentication standard is established by recording a pure passphrase, e.g., without watermark. (In other embodiments, the passphrase is recorded concurrently with recording an audio watermark that is output via an acoustic output transducer (e.g., speaker) 374. In yet other embodiments, the spoken passphrase may be input to the computer 310 via the microphone 372 to the I/O 360, to be mixed with the watermark audio signal within the computer 310, instead of transmitting the watermark audio signal via speaker 374.) Upon completion of recording, the authentication standard may be stored in the DRAM 320 by e.g., one of the cores $302_0$-$302_N$.

At a second time (during a second time period) after storage of the authentication standard, an authentication submission may be initiated by the user 380 (or another user). The authentication submission may include a user-uttered passphrase, which may be recorded using the recording logic 350, via acoustic input transducer (e.g., microphone) 372 concurrently with recording of a current watermark that may be generated by the audio watermark generation logic 340 and output as an acoustic watermark signal via the acoustic output transducer (e.g., speaker) 374. (In other embodiments (not shown), the spoken passphrase may be recorded via the microphone 372 and convolved with the current watermark within the processor 310, e.g., without transmission though the speaker 374.)

Upon receipt of the authentication submission, analysis logic 330 may determine, through comparison with the stored authentication standard and comparison with the current watermark, and optionally via additional analysis using stored parameters including biometric parameters associated with the voice of the user 380, and/or other parameters. The analysis logic 330 may determine whether to grant or deny authentication based on the comparison of the authentication submission to the authentication standard, the current watermark, and other factors, e.g., biometric voice comparison, time-dependent parameter comparison, etc.

Figure 4:
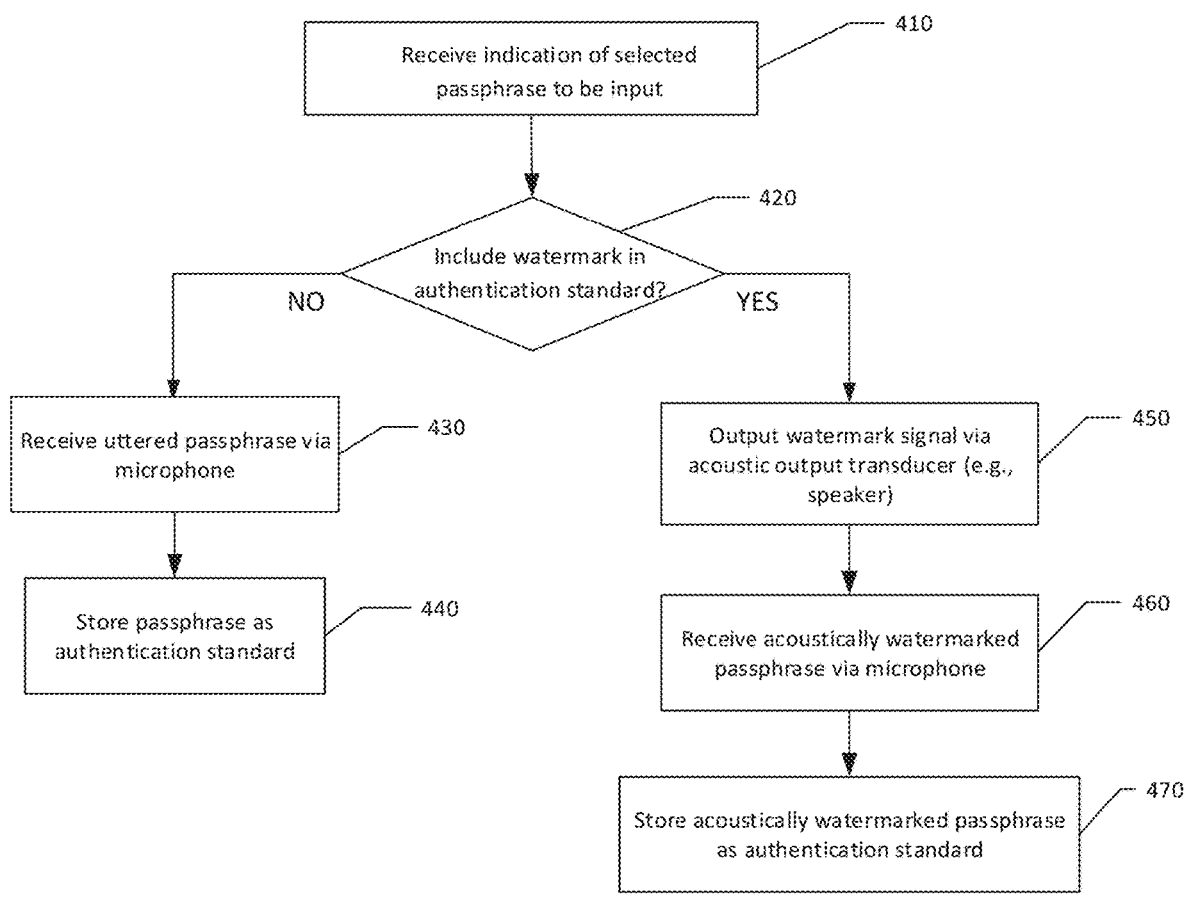
FIG. 4 is a flowchart of a method of establishing an authentication standard, according to an embodiment of the present invention.

FIG. 4 is a flowchart of a method 400 of establishing an authentication standard, according to an embodiment of the present invention. At block 410, a computing system including a processor receives an indication that a selected passphrase is to be input by a user via an acoustic input transducer (e.g., microphone) in order to create the authentication standard. Continuing to decision diamond 420, if watermark is not to be added to the paraphrase that is to become the authentication standard, advancing to block 430, the computing system receives an acoustic utterance (by a user) of the password via an acoustic input transducer (e.g., microphone). Moving to block 440, the computing device stores a recording of the password uttered by the user, e.g., a "pure" passphrase without watermark.

If, at decision diamond 420, it is determined that a watermark is to be included in the authentication standard, continuing to block 450, as the uttered password is being input (e.g., via microphone or other acoustic input transducer) the processor outputs a signal that is sent to an output acoustic transducer (e.g., speaker) that is to output an acoustic watermark signal, e.g., a plurality of frequencies to be superimposed with the uttered passphrase, e.g., convolved with the uttered passphrase due to concurrent transmission through an acoustic medium (e.g., air). Advancing to block 460, the processor is to receive the acoustically watermarked passphrase via the microphone. Proceeding to block 470, the authentication standard (e.g., acoustically watermarked passphrase) is stored by the processor (e.g., in DRAM).

Figure 5:
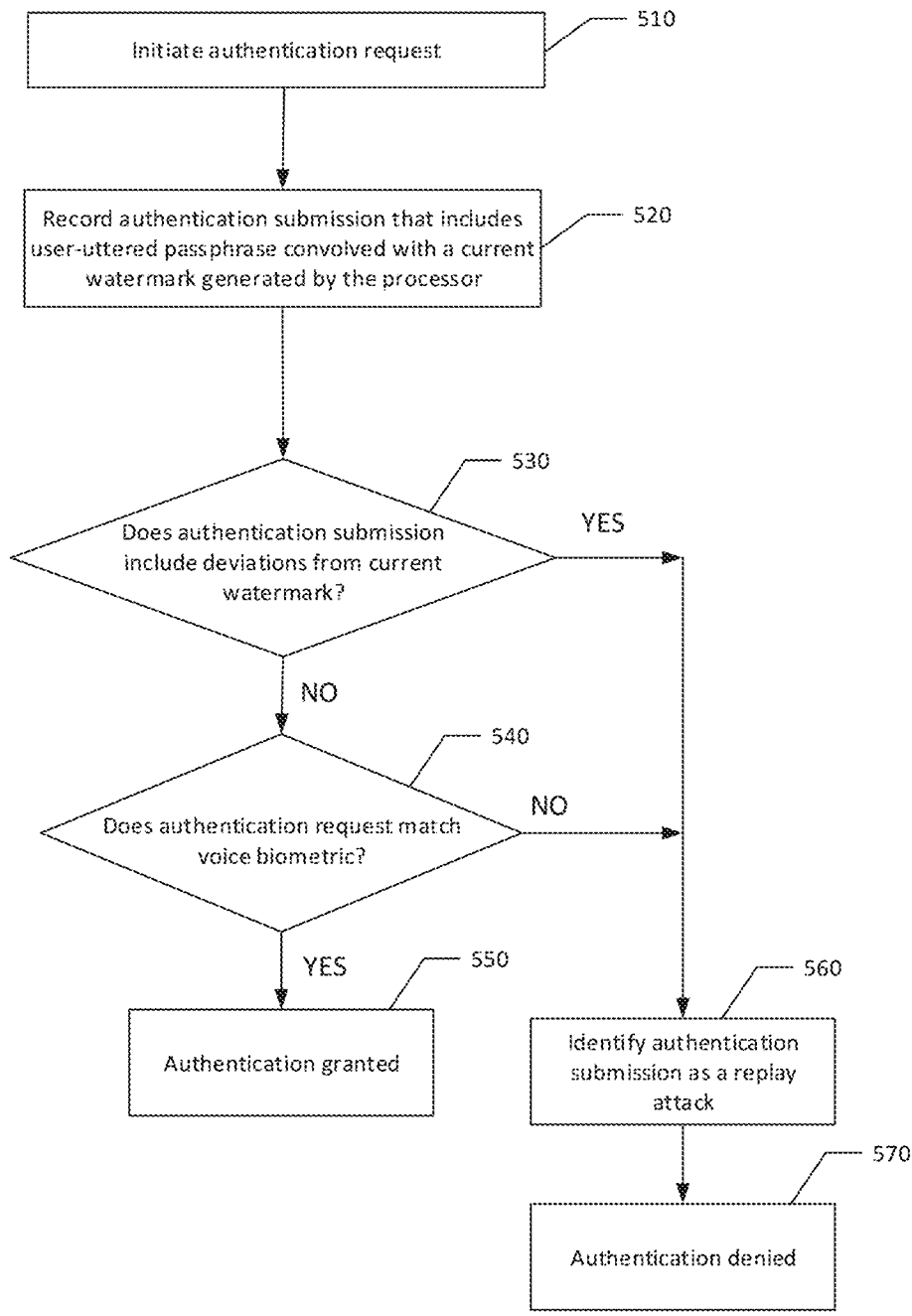
FIG. 5 is a flowchart of a method of authenticating a user, according to an embodiment of the present invention.

FIG. 5 is a flowchart of a method 500 of authenticating a user, according to an embodiment of the present invention. At block 510, a processor initiates an authentication request, e.g., in response to an indication of a user wish to log on to a system. Continuing to block 520, an authentication submission is recorded that includes a user-uttered passphrase convolved with a current watermark that is generated by the processor and output via e.g., a speaker, while a user utters the passphrase, and is recorded by the processor concurrently with the user-uttered passphrase. The convolution of the passphrase and the acoustic watermark may result from concurrent transmission of the passphrase and the watermark over a common acoustic transmission medium. (In another embodiment, convolution of the passphrase and the watermark may occur within the processor, e.g., via digital signal processing).

Advancing to decision diamond 530, a determination is made in the processor as to whether the authentication submission includes deviations from the current watermark. For example, a replay attack would include a prior watermark convolved with the password, and may also include the current watermark due to the replay attack being played back (instead of a user-uttered passphrase) while the current watermark is output from the speaker and captured, e.g., by an input microphone. If the authentication submission includes watermark information in addition to the current watermark, moving to block 560 the authentication submission is identified as a replay attack, and proceeding to block 570, authentication of the user is denied.

Back at decision diamond 530, if the authentication submission does not include deviations from the current watermark, proceeding to decision diamond 540 if comparison of voice biometrics of the authentication submission to the authentication standard indicate a match, proceeding to block 550, authentication is granted. If the voice biometrics of the authentication submission and the authentication standard do not match, moving to block 560, the authentication submission is identified as a replay attack, and proceeding to block 570 authentication is denied.

It is to be noted that in some embodiments, the authentication standard may include time dependent information that is encoded with the watermark. A match of the time dependent information in the authentication submission watermark and the time dependent information of the authentication standard may be an indication of a replay attack, because the time dependent information would not be identical to stored time dependent information unless the authentication submission was recorded at the time the authentication standard was established, and subsequently replayed as a malicious authentication submission.

It is to be noted that the order of decision diamonds 530, 540 is merely illustrative and may be performed in any suitable order.

Figure 6:
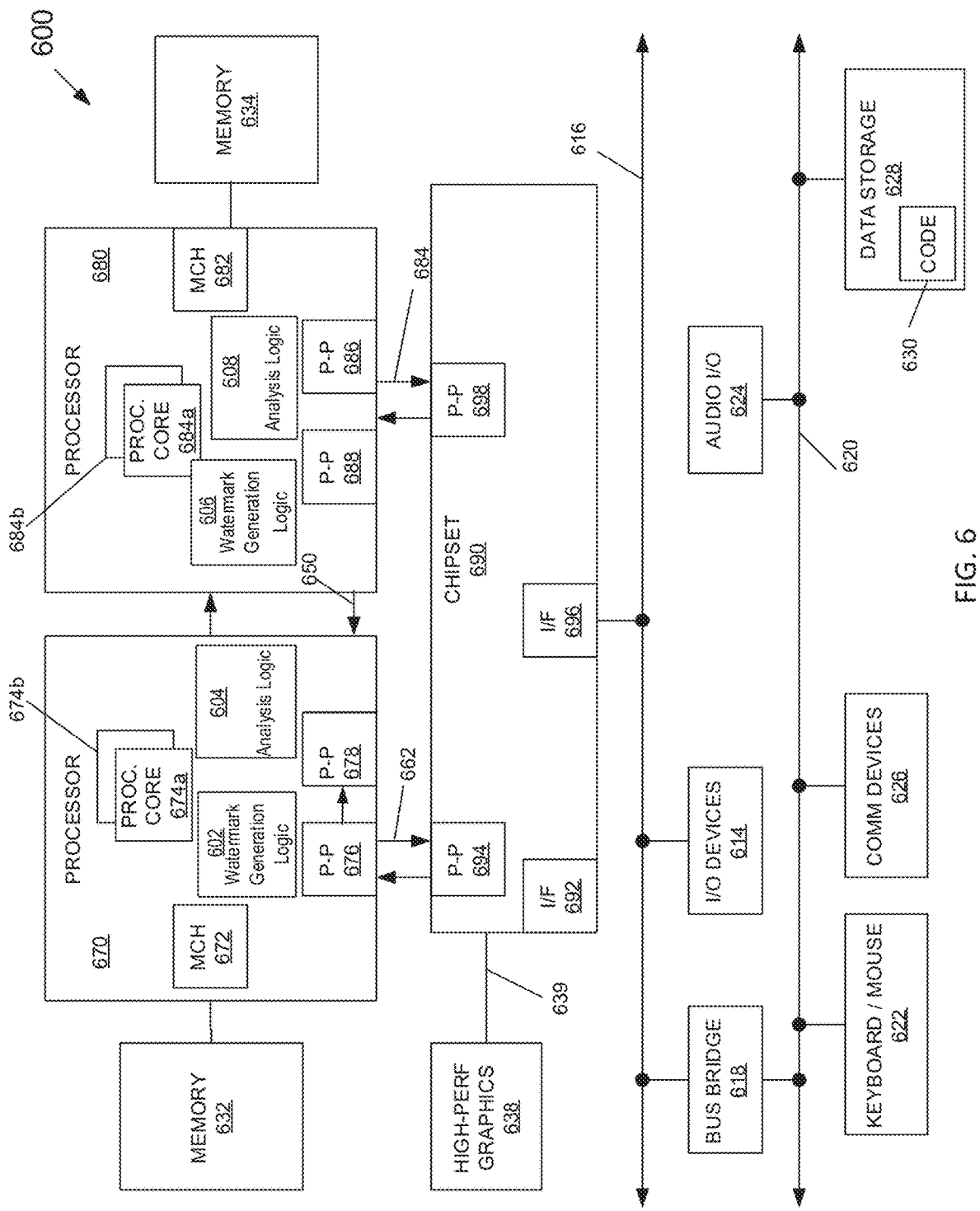
FIG. 6 is a block diagram of a system in accordance with an embodiment of the present invention.

Embodiments may be implemented in many different system types. Referring now to FIG. 6, shown is a block diagram of a system in accordance with an embodiment of the present invention. As shown in FIG. 6, multiprocessor system 600 is a point-to-point interconnect system, and includes a first processor 670 and a second processor 680 coupled via a point-to-point interconnect 650. As shown in FIG. 6, each of processors 670 and 680 may be multicore processors, including first and second processor cores (i.e., cores 674a and 674b and cores 684a and 684b), although potentially many more cores may be present in the processors. Processor 670 includes watermark generation logic 602 and analysis logic 604, and processor 680 includes watermark generation logic 606 and analysis logic 608, according to embodiments of the present invention. Each watermark generation logic 602, 606 is to generate a watermark for an authentication submission responsive to an authentication request, according to embodiments of the present invention. In some embodiments, the generated watermark may be output to an acoustic output transducer (e.g., speaker) while a passphrase is being recorded (using recording logic (not shown) in the respective processor 670, 680) via an acoustic input transducer (e.g., microphone) and the passphrase being recorded is to be acoustically convolved with the watermark via mixing of acoustic signals while traversing the same acoustic medium concurrently, according to embodiments of the present invention. (In other embodiments the passphrase is to be recorded by e.g., an acoustic input device, keyboard input, mouse input, etc., and the watermark is to be generated (based on the passphrase being recorded) while the passphrase is being recorded.) The passphrase and watermark may be mixed by the processor 670, 680, using, e.g., signal processing techniques.)

The analysis logic (604 or 608) may analyze the recorded authentication submission to determine whether there are deviations in the recorded watermarked signal as compared with the current watermark that was output during recording of in the authentication submission. The analysis logic 604 or 608 may also compare biometric voice parameters of the authentication submission to the biometric voice parameters of the authentication standard, and/or using other analysis techniques. Authentication may be granted or denied based on some or all of the above comparisons, according to embodiments of the present invention.

Still referring to FIG. 6, first processor 670 further includes a memory controller hub (MCH) 672 and point-to-point (P-P) interfaces 676 and 678. Similarly, second processor 680 includes a MCH 682 and P-P interfaces 686 and 688. As shown in FIG. 6, MCHs 672 and 682 couple the processors to respective memories 632 and 634, which may be portions of system memory (e.g., DRAM) locally attached to the respective processors. First processor 670 and second processor 680 may be coupled to a chipset 690 via P-P interconnects 662 and 684, respectively. As shown in FIG. 6, chipset 690 includes P-P interfaces 694 and 698.

Furthermore, chipset 690 includes an interface 692 to couple chipset 690 with a high performance graphics engine 638 via a P-P interconnect 639. In turn, chipset 690 may be coupled to a first bus 616 via an interface 696. As shown in FIG. 6, various input/output (I/O) devices 614 may be coupled to first bus 616, along with a bus bridge 618, which couples first bus 616 to a second bus 620. Various devices may be coupled to second bus 620 including, for example, a keyboard/mouse 622, communication devices 626 and a data storage unit 628 such as a disk drive or other mass storage device which may include code 630, in one embodiment. Further, an audio input/output (I/O) 624 may be coupled to second bus 620. One or more of the devices 614, 622, 624, 626 may provide interrupts to be processed by processor 670 or processor 680, according to embodiments of the present invention. Embodiments can be incorporated into other types of systems including mobile devices such as a smart cellular telephone, tablet computer, netbook, Ultrabook™, or so forth.

Figure 7:
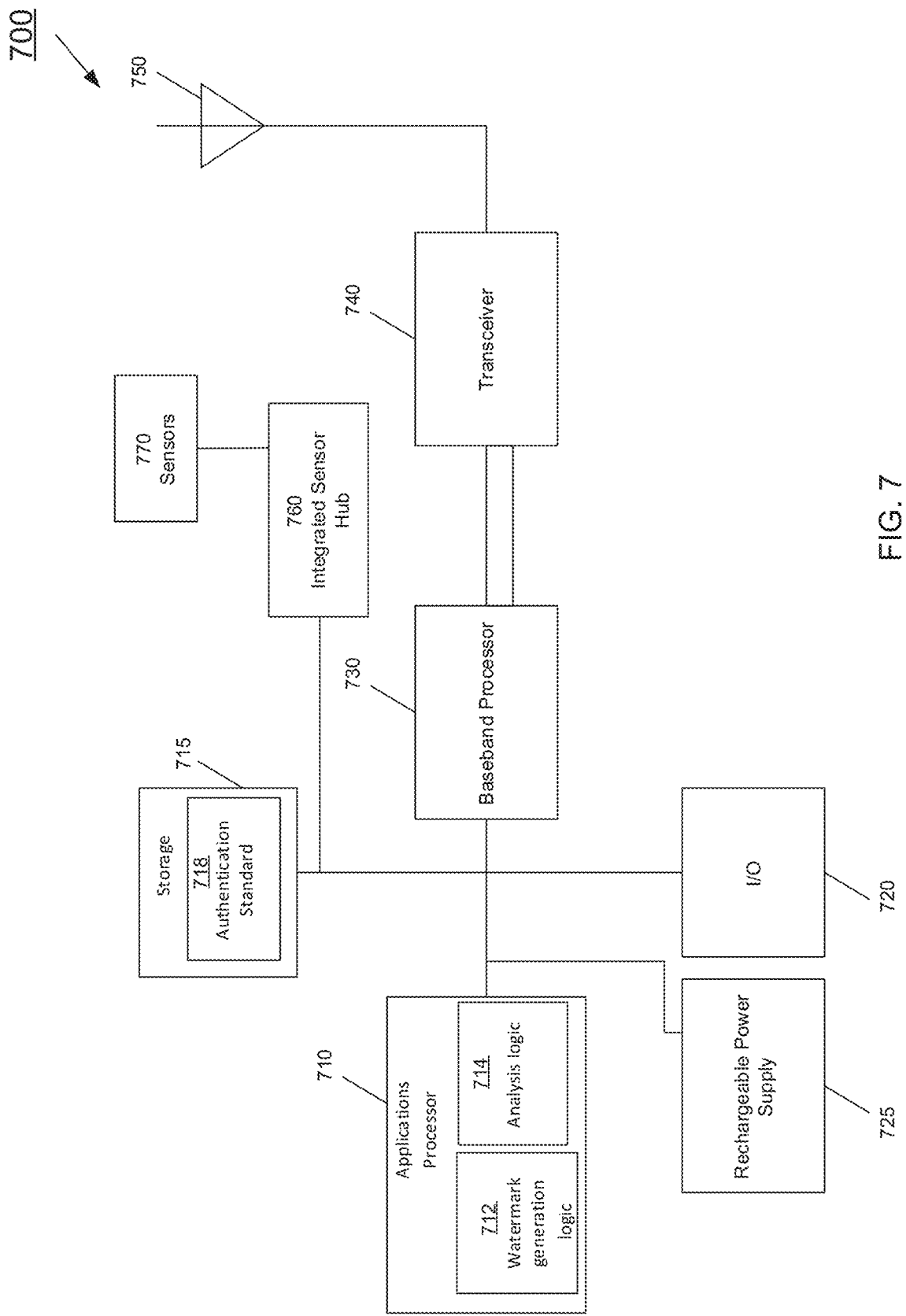
FIG. 7 is a block diagram of a system in accordance with another embodiment of the present invention.

Embodiments can be incorporated into other types of systems including mobile devices such as a cellular telephone. Referring now to FIG. 7, shown is a block diagram of a system in accordance with another embodiment of the present invention. As shown in FIG. 7, system 700 may be a mobile device and may include various components. As shown in the high level view of FIG. 7, an applications processor 710, which may be a central processing unit of the device, is in communication with various components, including storage 715. Storage 715, in various embodiments, may include both program and data storage portions.

Applications processor 710 may further be coupled to an input/output system 720, which in various embodiments may include a display and one or more input devices such as a touch keypad, which itself can appear on the display when processed. The system 700 may also include an integrated sensor hub (ISH) 760 that may receive data from one or more sensors 770.

Applications processor 710 includes watermark generation logic 712 and analysis logic 714, according to embodiments of the present invention. The watermark generation logic 712 is to generate a watermark responsive to an authentication request, e.g., to be output to an acoustic output transducer (e.g., speaker) while a passphrase is being recorded (e.g., as an authentication submission) via an acoustic input transducer (e.g., microphone) and the passphrase being recorded is to be convolved with the watermark via mixing of acoustic signals while traversing the same acoustic medium concurrently, according to embodiments of the present invention. (In other embodiments the passphrase may be input via an acoustic input transducer (e.g., microphone) or via another input technique (e.g. keyboard, mouse, etc.) and the passphrase may be convolved with the generated watermark by the applications processor 710, e.g., via digital signal processing techniques.)

The analysis logic 714 may analyze the recorded authentication submission to determine whether there are any differences in the recorded watermark as compared to the current watermark that was acoustically output during the recording. Additionally, other analysis techniques may be applied, such as biometric analysis based on vocal parameters. Authentication may be granted or denied based on some or all of the above comparisons, according to embodiments of the present invention.

Applications processor 710 also may couple to baseband processor 730, which may condition signals such as voice and data communications for output, as well as conditioning incoming telephone and other signals. As seen, baseband processor 730 couples to transceiver 740, which may enable both receive and transmit capabilities. In turn, transceiver 740 may be in communication with an antenna 750, e.g., any type of antenna capable of transmitting and receiving voice and data signals via one or more communication protocols such as via a wireless wide area network (e.g., a 3G or 4G network) and/or a wireless local area network, such as a BLUETOOTH™ or so-called WI-FI™ network in accordance with an Institute of Electrical and Electronics Engineers 802.11 standard. As seen, system 700 may further include a rechargeable power supply 725 having a rechargeable battery to enable operation in a mobile environment. While shown with this particular implementation in the embodiment of FIG. 7, the scope of the present invention is not limited in this regard.

Other embodiments are described below.

In a first example, a system includes a processor including watermark logic to output a first watermark to an output device that outputs a first watermark signal, based on the first watermark, to an acoustic transmission medium. The processor also includes recording logic to capture, at a first time period, an authentication submission comprising the first watermark signal convolved, via the acoustic transmission medium, with a first passphrase signal. The system also includes a dynamic random access memory (DRAM).

In a second example that includes the system of example 1, the first watermark is determined based on one or more component frequencies of the first passphrase signal.

In a third example that includes the system of example 1, the system further includes analysis logic to determine whether to grant authentication to a user based on a comparison of the authentication submission to the first watermark.

In a fourth example that includes the system of example 3, determination of whether to grant authentication is further based on a comparison of one or more biometric parameters associated with the first passphrase signal to an authentication standard, wherein the authentication standard comprises a second passphrase signal that is recorded at a second time period.

In a fifth example that includes the system of any one of examples 3 and 4, determination of whether to grant authentication is further based on a comparison of an embedded parameter in the authentication submission, to a corresponding embedded parameter in the first watermark.

In a sixth example that includes the system of example 5, the embedded parameter comprises a date stamp.

A seventh example is method that includes outputting, by a processor, a first watermark to an output device that is to output a first watermark signal, based on the first watermark, to an acoustic transmission medium; and receiving, at the processor during a first time period, an authentication submission comprising a convolution of the first watermark signal and a first passphrase signal that are acoustically mixed via the acoustic transmission medium.

An eighth example that includes the method of example 7 further includes generating the first watermark by the processor based at least in part on the first passphrase signal.

In a ninth example that includes the method of example 8, the first watermark signal includes one or more acoustic frequencies determined based on the first passphrase signal.

In a tenth example that includes the method of example 7, the first watermark signal includes first timestamp information associated with generation of the first watermark.

In an eleventh example that includes the method of example 7, the method further includes performing a first comparison of the authentication submission to the first watermark, and determining whether to grant authentication to a user based at least in part on the first comparison.

A $12^{th}$ example that includes the method of example 7, further includes capturing, during a second time period distinct from the first time period, an authentication standard that includes a second passphrase signal, and storing the authentication standard.

A $13^{th}$ example that includes the method of example 12 further includes determining whether to grant authentication to the user based at least in part on a second comparison of first information embedded in the authentication submission, to second information embedded in the authentication standard.

In a $14^{th}$ example that includes the method of example 13, the first information includes first timestamp information associated with the first time period and the second information includes second timestamp information associated with the second time period.

A $15^{th}$ example that includes the method of example 14, further denying authentication when the first timestamp information is the same as the second timestamp information.

In a $15^{th}$ example that includes the method of example 13, the first information includes first biometric parameters associated the first passphrase signal and the second information includes second biometric parameters associated with the second passphrase signal.

In a $17^{th}$ example machine-readable storage includes machine-readable instructions, when executed, to implement the method of any of examples 7-16.

In an $18^{th}$ example, apparatus includes means for performing the method of any one of examples 7-16.

A $19^{th}$ example is at least one computer readable storage medium having instructions stored thereon for causing a system to receive, at a first time interval, an authentication submission comprising a convolution of a first passphrase and first watermark signal, the first watermark signal based on a first watermark generated by a computing device, where the first watermark signal and the first passphrase signal are acoustically convolved via an acoustic transmission medium prior to reception of the authentication submission, and to determine whether to authenticate a first user associated with the authentication submission based at least in part on a first comparison of the authentication submission to the first watermark.

A $20^{th}$ example includes the instructions of example 19, further including instructions to capture an authentication standard comprising a second passphrase signal at a second time interval that is distinct from the first time interval.

A $21^{st}$ example includes the instructions of example 20, where authentication of the first user is determined further based on a second comparison of a first biometric parameter associated with the first passphrase signal to a second biometric parameter associated with the second passphrase signal.

A $22^{nd}$ example includes the instructions of any one of examples 20-21, where authentication of the first user is determined further based on a comparison of a first time dependent parameter associated with the first time interval to a second time dependent parameter associated with the second time interval.

A $23^{rd}$ example is method that includes receiving, at a first time interval, an authentication submission comprising a convolution of a first passphrase and first watermark signal, the first watermark signal based on a first watermark generated by a computing device, where the first watermark signal and the first passphrase signal are acoustically convolved via an acoustic transmission medium prior to reception of the authentication submission. The method also includes determining whether to authenticate a first user associated with the authentication submission based at least in part on a first comparison of the authentication submission to the first watermark.

A 24th example includes the method of example 23, further including capturing an authentication standard comprising a second passphrase signal at a second time interval that is distinct from the first time interval.

In a 25th example includes the method of example 24, authentication of the first user is determined further based on a second comparison of a first biometric parameter associated with the first passphrase signal to a second biometric parameter associated with the second passphrase signal.

In a 26th example includes the method of example of any one of examples 24-25, authentication of the first user is determined further based on a comparison of a first time dependent parameter associated with the first time interval to a second time dependent parameter associated with the second time interval.

Embodiments may be used in many different types of systems. For example, in one embodiment a communication device can be arranged to perform the various methods and techniques described herein. Of course, the scope of the present invention is not limited to a communication device, and instead other embodiments can be directed to other types of apparatus for processing instructions, or one or more machine readable media including instructions that in response to being executed on a computing device, cause the device to carry out one or more of the methods and techniques described herein.

Embodiments may be implemented in code and may be stored on a non-transitory storage medium having stored thereon instructions which can be used to program a system to perform the instructions. The storage medium may include, but is not limited to, any type of disk including floppy disks, optical disks, solid state drives (SSDs), compact disk read-only memories (CD-ROMs), compact disk rewritables (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), magnetic or optical cards, or any other type of media suitable for storing electronic instructions.

While the present invention has been described with respect to a limited number of embodiments, those skilled in the art will appreciate numerous modifications and variations therefrom. It is intended that the appended claims cover all such modifications and variations as fall within the true spirit and scope of this present invention.

What is claimed is:

1. An apparatus, comprising:
   one or more processors; and
   a storage disk or memory including machine-readable instructions that, when executed, cause the one or more processors to:
   access an authentication standard including a first acoustically watermarked passphrase, the first acoustically watermarked passphrase having a first acoustic watermark and a first acoustic passphrase acoustically mixed with the first acoustic watermark during a first time period via a first common acoustic medium, the first acoustic watermark output by an acoustic output transducer during the first time period, the first acoustic passphrase spoken by a user during the first time period, the first acoustic watermark and the first acoustic passphrase captured by an acoustic input transducer during the first time period;
   access an authentication submission including a second acoustically watermarked passphrase, the second acoustically watermarked passphrase having a second acoustic watermark and a second acoustic passphrase acoustically mixed with the second acoustic watermark during a second time period subsequent to the first time period via a second common acoustic medium, at least a portion of the second acoustic watermark output by the acoustic output transducer during the second time period, the second acoustic watermark and the second acoustic passphrase captured by the acoustic input transducer during the second time period;
   determine whether a first timestamp embedded in the first acoustic watermark matches a second timestamp embedded in the second acoustic watermark; and
   deny authentication in response to determining that the second timestamp matches the first timestamp.

2. The apparatus of claim 1, wherein the user is a first user, and wherein the second acoustic passphrase is spoken by the first user during the second time period, spoken by a second user different from the first user during the second time period, or played from an audio recording medium during the second time period.

3. The apparatus of claim 1, wherein the second acoustic watermark includes a first instance of the first acoustic watermark output by the acoustic output transducer during the first time period mixed with a second instance of the first acoustic watermark output by the acoustic output transducer during the second time period, the second acoustic watermark being indicative of a replay attack.

4. The apparatus of claim 1, wherein the instructions, when executed, cause the one or more processors to generate the first acoustic watermark based on one or more component frequencies of the first acoustic passphrase.

5. The apparatus of claim 1, wherein the instructions, when executed, further cause the one or more processors to:
   determine whether the second acoustic watermark matches the first acoustic watermark; and
   deny authentication in response to determining that the second acoustic watermark does not match the first acoustic watermark.

6. The apparatus of claim 5, wherein the instructions, when executed, further cause the one or more processors to:
   determine whether the second acoustic passphrase matches the first acoustic passphrase; and
   grant authentication in response to determining that the second acoustic passphrase matches the first acoustic passphrase, that the second acoustic watermark matches the first acoustic watermark, and that the second timestamp does not match the first timestamp.

7. The apparatus of claim 6, wherein the instructions, when executed, further cause the one or more processors to:
   determine whether a first biometric parameter of the first acoustic passphrase matches a second biometric parameter of the second acoustic passphrase; and
   grant authentication in response to determining that the second biometric parameter matches the first biometric parameter, that the second acoustic passphrase matches the first acoustic passphrase, that the second acoustic watermark matches the first acoustic watermark, and that the second timestamp does not match the first timestamp.

8. A non-transitory computer readable storage medium comprising instructions that, when executed, cause one or more processors to at least:

access an authentication standard including a first acoustically watermarked passphrase, the first acoustically watermarked passphrase having a first acoustic watermark and a first acoustic passphrase acoustically mixed with the first acoustic watermark during a first time period via a first common acoustic medium, the first acoustic watermark output by an acoustic output transducer during the first time period, the first acoustic passphrase spoken by a user during the first time period, the first acoustic watermark and the first acoustic passphrase captured by an acoustic input transducer during the first time period;

access an authentication submission including a second acoustically watermarked passphrase, the second acoustically watermarked passphrase having a second acoustic watermark and a second acoustic passphrase acoustically mixed with the second acoustic watermark during a second time period subsequent to the first time period via a second common acoustic medium, at least a portion of the second acoustic watermark output by the acoustic output transducer during the second time period, the second acoustic watermark and the second acoustic passphrase captured by the acoustic input transducer during the second time period;

determine whether a first timestamp embedded in the first acoustic watermark matches a second timestamp embedded in the second acoustic watermark; and deny authentication in response to determining that the second timestamp matches the first timestamp.

9. The non-transitory computer readable storage medium of claim 8, wherein the second acoustic watermark includes a first instance of the first acoustic watermark output by the acoustic output transducer during the first time period mixed with a second instance of the first acoustic watermark output by the acoustic output transducer during the second time period, the second acoustic watermark being indicative of a replay attack.

10. The non-transitory computer readable storage medium of claim 8, wherein the instructions, when executed, further cause the one or more processors to generate the first acoustic watermark based on one or more component frequencies of the first acoustic passphrase.

11. The non-transitory computer readable storage medium of claim 8, wherein the instructions, when executed, further cause the one or more processors to:
determine whether the second acoustic watermark matches the first acoustic watermark; and
deny authentication in response to determining that the second acoustic watermark does not match the first acoustic watermark.

12. The non-transitory computer readable storage medium of claim 11, wherein the instructions, when executed, further cause the one or more processors to:
determine whether the second acoustic passphrase matches the first acoustic passphrase; and
grant authentication in response to determining that the second acoustic passphrase matches the first acoustic passphrase, that the second acoustic watermark matches the first acoustic watermark, and that the second timestamp does not match the first timestamp.

13. The non-transitory computer readable storage medium of claim 12, wherein the instructions, when executed, further cause the one or more processors to:
determine whether a first biometric parameter of the first acoustic passphrase matches a second biometric parameter of the second acoustic passphrase; and grant authentication in response to determining that the second biometric parameter matches the first biometric parameter, that the second acoustic passphrase matches the first acoustic passphrase, that the second acoustic watermark matches the first acoustic watermark, and that the second timestamp does not match the first timestamp.

14. A method, comprising:
accessing, by executing an instruction with one or more processors, an authentication standard including a first acoustically watermarked passphrase, the first acoustically watermarked passphrase having a first acoustic watermark and a first acoustic passphrase acoustically mixed with the first acoustic watermark during a first time period via a first common acoustic medium, the first acoustic watermark output by an acoustic output transducer during the first time period, the first acoustic passphrase spoken by a user during the first time period, the first acoustic watermark and the first acoustic passphrase captured by an acoustic input transducer during the first time period;
accessing, by executing an instruction with the one or more processors, an authentication submission including a second acoustically watermarked passphrase, the second acoustically watermarked passphrase having a second acoustic watermark and a second acoustic passphrase acoustically mixed with the second acoustic watermark during a second time period subsequent to the first time period via a second common acoustic medium, at least a portion of the second acoustic watermark output by the acoustic output transducer during the second time period, the second acoustic watermark and the second acoustic passphrase captured by the acoustic input transducer during the second time period;
determining, by executing an instruction with the one or more processors, whether a first timestamp embedded in the first acoustic watermark matches a second timestamp embedded in the second acoustic watermark; and
denying authentication in response to determining that the second timestamp matches the first timestamp.

15. The method of claim 14, wherein the user is a first user, and wherein the second acoustic passphrase is spoken by the first user during the second time period, spoken by a second user different from the first user during the second time period, or played from an audio recording medium during the second time period.

16. The method of claim 14, wherein the second acoustic watermark includes a first instance of the first acoustic watermark output by the acoustic output transducer during the first time period mixed with a second instance of the first acoustic watermark output by the acoustic output transducer during the second time period, the second acoustic watermark being indicative of a replay attack.

17. The method of claim 14, further including generating, by executing an instruction with the one or more processors, the first acoustic watermark based on one or more component frequencies of the first acoustic passphrase.

18. The method of claim 14, further including:
determining, by executing an instruction with the one or more processors, whether the second acoustic watermark matches the first acoustic watermark; and
denying authentication in response to determining that the second acoustic watermark does not match the first acoustic watermark.

19. The method of claim 18, further including:

determining, by executing an instruction with the one or more processors, whether the second acoustic passphrase matches the first acoustic passphrase; and granting authentication in response to determining that the second acoustic passphrase matches the first acoustic passphrase, that the second acoustic watermark matches the first acoustic watermark, and that the second timestamp does not match the first timestamp.

20. The method of claim 19, further including:

determining, by executing an instruction with the one or more processors, whether a first biometric parameter of the first acoustic passphrase matches a second biometric parameter of the second acoustic passphrase; and granting authentication in response to determining that the second biometric parameter matches the first biometric parameter, that the second acoustic passphrase matches the first acoustic passphrase, that the second acoustic watermark matches the first acoustic watermark, and that the second timestamp does not match the first timestamp.

\* \* \* \* \*